May 5, 1936.  C. H. HOWLAND-SHEARMAN  2,039,849
TOOL HEAD
Filed July 27, 1934    2 Sheets-Sheet 1
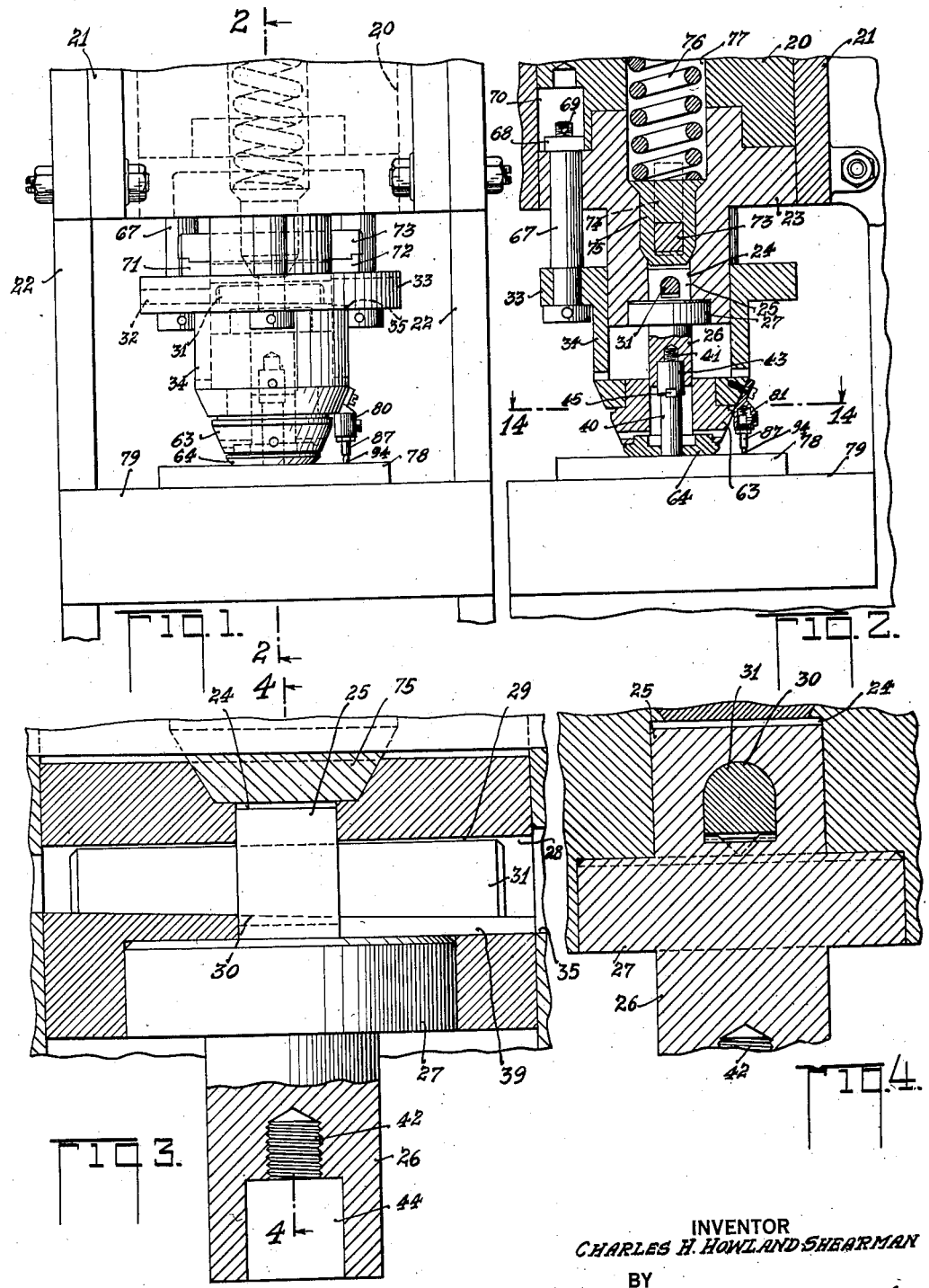
INVENTOR
CHARLES H. HOWLAND SHEARMAN
BY
ATTORNEY

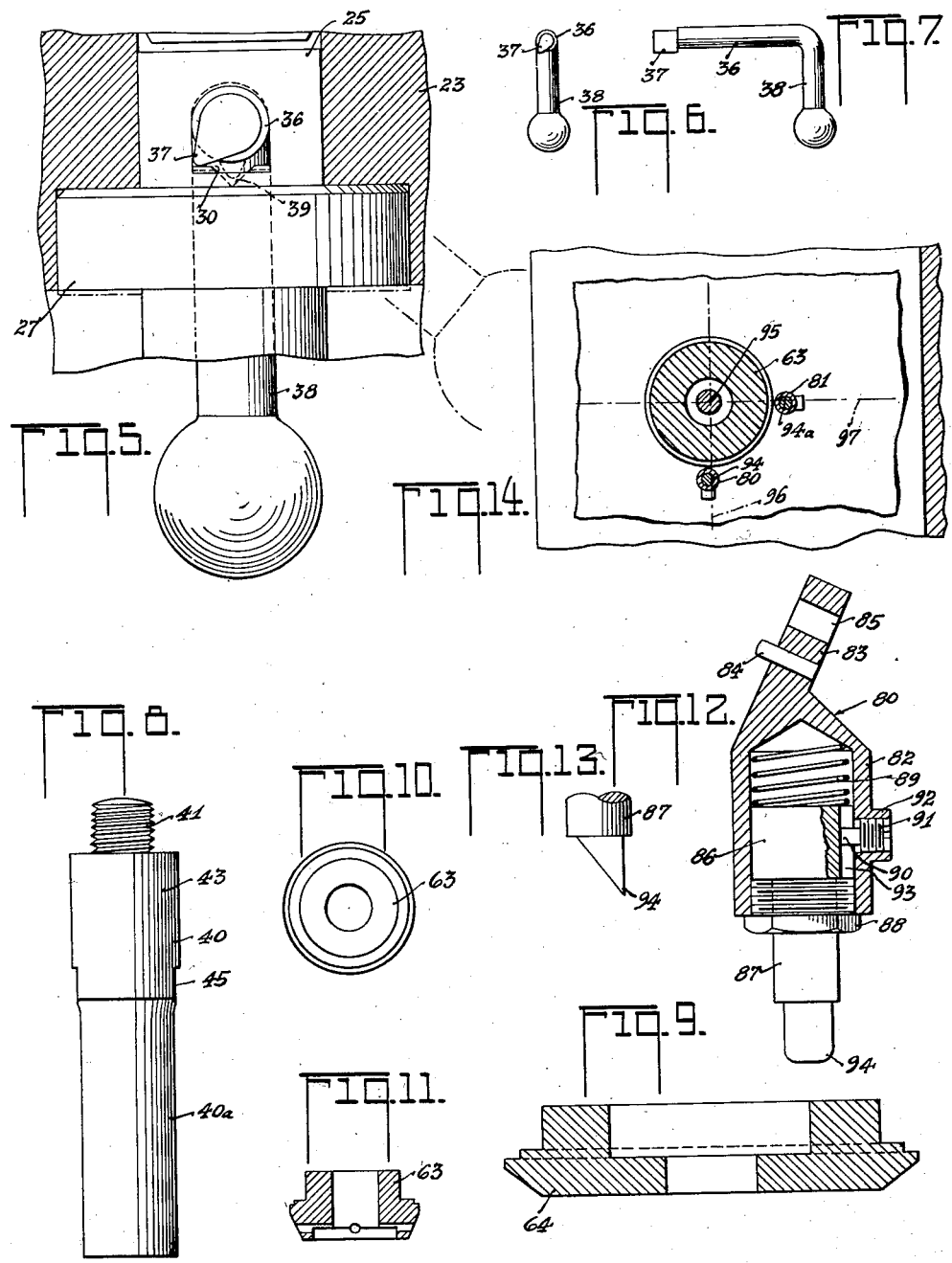

Patented May 5, 1936

2,039,849

UNITED STATES PATENT OFFICE 2,039,849

TOOL HEAD

Charles H. Howland-Shearman, Hamden, Conn.

Application July 27, 1934, Serial No. 737,159

1 Claim. (Cl. 164—118)

This invention pertains to improvements in tool heads for certain types of machine tools. While it is particularly intended for use on the Kinetor or cold flowing machine fully disclosed in copending application Serial No. 737,160, filed July 27, 1934, its use is not limited thereto, as it may be applied to various other machines such as punch presses, broaching machines and the like.

An object of the invention is to provide rigid and accurate means for holding the working tools.

Another object is to provide means by which the working tools are rendered easily interchangeable.

A further object is to provide for holding a plurality of tools in a single mounting.

A still further object is to provide means for accurately locating the work with respect to the tool or tools.

Other objects will appear in the following description in connection with the attached drawings, in which:

Figure 1 is an exterior view of a machine tool head embodying the invention;

Figure 2 is a vertical section of the same in the plane 2—2, Figure 1;

Figure 3 is an enlarged detail partial section of the tool holder mounting;

Figure 4 is a fragmental section of the same on the lines 4—4, Figure 3;

Figure 5 is a fragmental view illustrating the manner of demounting the tool holder;

Figure 6 is an end view of the demounting wrench;

Figure 7 is a side elevation of the same;

Figure 8 is a side elevation of one form of tool;

Figure 9 is a vertical sectional view of a guide or contact shoe for use with a single tool;

Figure 10 is a plan view of the sleeve nose adapted to receive the contact shoe;

Figure 11 is a vertical section of the same;

Figure 12 is an enlarged sectional view of the work positioning device shown in Figures 1 and 2;

Figure 13 is a fragmental side elevation of a locating knife shown in Figure 12; and Figure 14 is a cross sectional view in the plane 14—14, Figure 2, illustrating the method of locating a work piece.

Referring to Figures 1 and 2, a ram 20 is vertically slidable in a guide 21 secured to the stationary frame or body 22 of a machine tool. Secured to the ram 20 and forming the lower part thereof is a cylindrical flanged member 23. The member 23 contains a rectangular hole 24 adapted to secure the square shank 25 of a tool holder 26. A flange 27 on the holder 26 is concentrically socketed in the lower portion of the member 23.

A tapered cross hole 28, having a semi-cylindrical upper surface 29, and a corresponding hole 30 through the shank 25 are adapted to receive a tapered key 31. When the key 31 is driven home as shown in Figure 3, the shank 25 is wedged upward, thus drawing the flange 27 firmly home in its socket in the member 23. The flange 27 may be slightly tapered to ensure a tight fit.

To remove the tool holder, the key 31 is first driven out, a hole 32 being provided in the flange 33 on a slidable outer shell 34, hereinafter described, to admit a drift pin. The outer flange 33 is also cut away at 35, Figures 1 and 3, to permit egress of the key 31. To dislodge the tool holder 26, a cylindrical wrench 36, having an angular cam tip 37 is inserted in the cross hole 28 until the cam 37 enters the hole 30 in shank 25 and engages the bottom thereof angularly as shown in Figure 5. The handle 38 of the wrench 36 is now swung counterclockwise as shown in dot and dash lines, Figure 5, causing the cam 37 to force the shank 25 downward, thus loosening the flange 27 from its socket. The wrench 36 is removed, a V groove 39 in the bottom of cross hole 28 facilitating the egress of the cam 37, and the holder 26 may then be dropped out of place.

In the single tool mounting illustrated in Figures 1, 2, 3, and 4, a tool 40 of the type shown in Figure 8 is used. The tool 40 has an upper threaded portion 41 adapted to be screwed in to a thread 42 in holder 26, and is properly alined with 26 by an enlarged cylindrical portion 43 accurately fitted to a guide recess 44. Flats 45 are provided to engage a wrench for screwing the tool 40 into the holder 26. It is obvious that the lower portion 40a of tool 40 herein shown as cylindrical may have any other cross section according to the shape of the hole which is to be produced by it.

The outer sliding shell 34 has pressed or otherwise fastened into the bottom part thereof a nose member 63 containing a guide plate or shoe 64 closely fitted about and slidable on the tool 40 as shown in Figure 2.

Guide sleeves 67, Figures 1 and 2, are secured in circumferentially spaced relation to the flange 33 of the shell 34, and are slidably guided in the lower ram member 23. Nuts 68 on bolts 69 through the sleeves 67 are disposed in slots 70 in the ram 20 and engage the top of member 23, thereby determining the lower limit to which the shell 34 can slide on the member 23.

Upward extensions 71 and 72 of the shell 34, Figure 1 are spanned by a cross key 73 which passes through a vertical slot 74 in the lower ram member 23 and engages a central plug 75 slidable in 23. A heavy compression spring 76 disposed in a central hole 77 in ram 20 and member 23, presses the plug 75, key 73 and shell 34 downward. The shell 34 and related parts thus constitute a clamping member or fracture proofer of the type fully disclosed in copending application Serial No. 737,156, filed July 27, 1934 being adapted to be pressed against a work piece 78 supported by the machine table 79 as the tool 40 is forced through 78, the pressure with which the plate or shoe 64 holds the piece 78 clamped increasing as the spring 76 is further compressed by the downward movement of the ram 20.

A pair of finders 80 and 81, Figures 1 and 2, are bolted and doweled to the shell 34 at 90° angular distance from each other as shown in Figure 14. Figures 12 and 13 show the structure of the finder 80, this structure being typical of both these devices. Referring to Figure 12, a cylindrical body 82 has an upper inclined lip 83 provided with a dowel pin 84 and bolt hole 85 for attachment to sleeve 34. A plunger 86, having a reduced shank 87 slidably guided in a screwed bushing 88, is pressed downward in body 82 by a spring 89. A flat nose 90 of a screw 91 threaded into a boss 92 on body 82 slidably engages a longitudinal groove 93 on the plunger 86, thereby preventing 86 from turning. The lower end of the shank 87 is ground off angularly to form a knife or chisel edge 94 as shown in Figure 13. When finders 80 and 81 are bolted to the shell 34 the lines of thin knife edges 94 and 94a cross exactly on the center line of the tool 40.

The operation of the locating finders is as follows: It being desired, for example, to pierce the work piece 78, Figure 14, at a location whose center is indicated by the numeral 95, lines 96 and 97 are first scribed on 78 through the point 95 and at right angles to each other. The piece 78 is then placed on table 79 beneath the tool head and moved about until the knife edges 94 and 94a aline with the scribe lines 96 and 97. The point 95 is thereby located accurately in the center line of the tool 40. The knife edges normally project slightly below the tool 40 and shoe 64 and are pressed lightly against the work piece 78 during the positioning thereof.

From the foregoing description it is apparent that the invention presents a rigidly guided and accurate tool head comprising an interchangeable form of tool holder adaptable to a variety of tool arrangements, and provided with a work clamping device carrying means for locating work without the use of punch marks or fixtures.

While the invention is illustrated in preferred form it is not limited to the precise structures shown, as various modifications may be made without departing from the scope of the appended claim.

What is claimed is:

In combination, a hollow ram having an annular recess in one end thereof and a flat shoulder at the inner end of said recess, a tool holder including a disk having its periphery closely fitted in said recess and a flat face engaging said shoulder, a rigid shank on said disk projecting into said ram beyond said shoulder and having a transverse opening, a tool secured in said holder, and a removable tapered cross key normally retained in said ram and engaging said transverse opening to secure said disk in said recess, said opening having a wall surface adapted to fit a wrench, said wrench having thereon a cam cooperative with said shank to dislodge said disk from said recess when said key has been removed.

CHARLES H. HOWLAND-SHEARMAN.